United States Patent Office 2,979,655
Patented Apr. 11, 1961

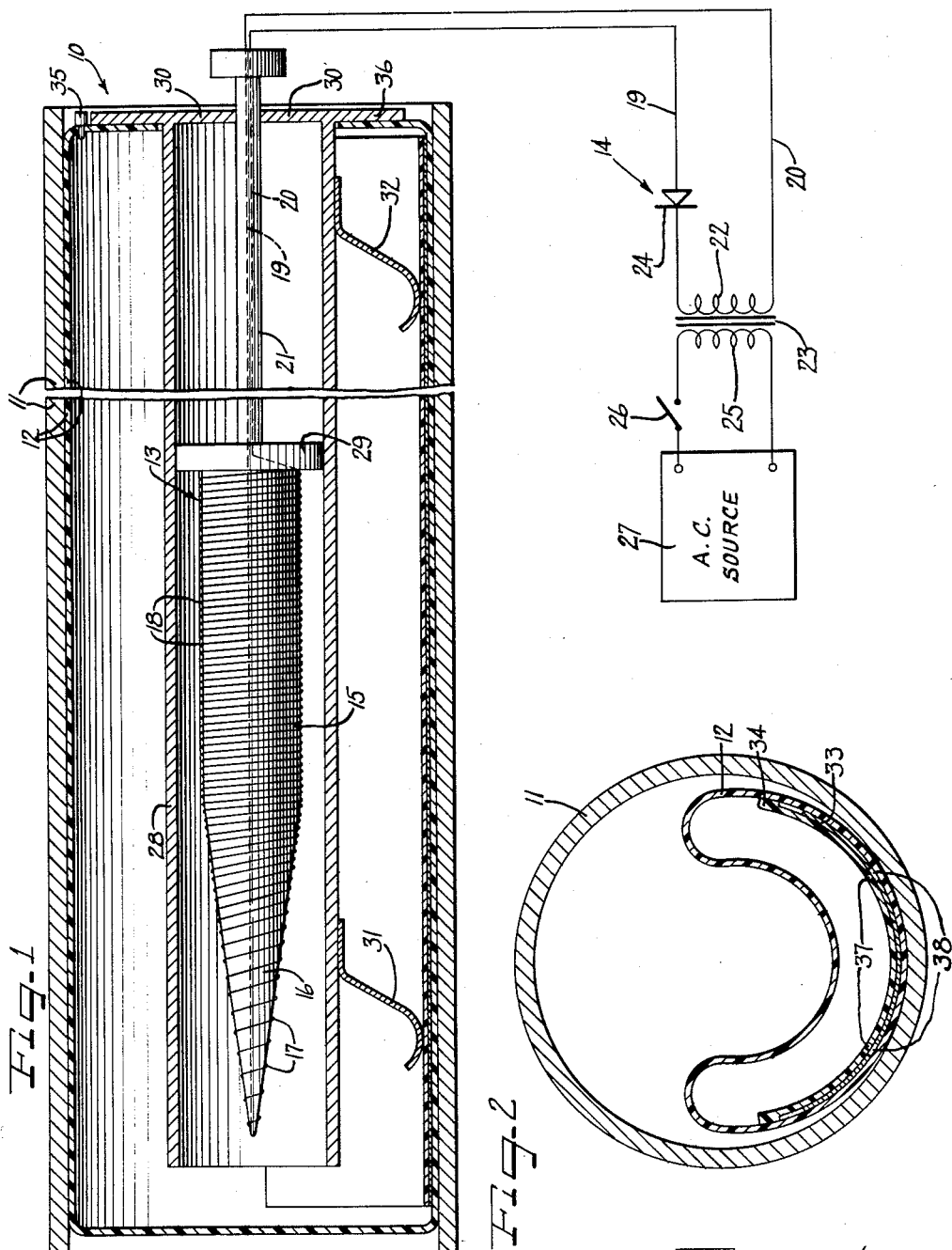

2,979,655

METHOD AND APPARATUS FOR DETECTING FLAWS

Taber de Forest, Northbrook, Ill., assignor to Magnaflux Corporation, Chicago, Ill., a corporation of Delaware Filed Sept. 19, 1957, Ser. No. 684,881

10 Claims. (Cl. 324—38)

This invention relates to methods and apparatus for detecting flaws and more particularly to a flaw detection system utilizing a tube on the inside of a pipe under test, although certain features of the invention have application to other types of systems.

In my Patent No. 2,764,733 issued September 25, 1956, I disclose methods and means for detecting flaws in which a member having uniformly distributed magnetizable material therein is disposed against a surface portion of the article under test while a uni-directional magnetic flux is induced in the article. The member is then removed and free magnetizable particles such as powdered iron are disposed over the surface thereof. The particles will uniformly distribute themselves over the member except that they will be attracted to highly magnetized portions of the member which were engaged over flaws or defects in the article during the magnetization step. In my patent, I also disclose a system for testing pipe in which a tube is disposed within the pipe, the tube having uniformly distributed magnetizable material therein. I also disclose a system in which an alternating current source is connected in series with a direct current source to apply a biasing alternating field which is superimposed on the uni-directional field.

The systems as disclosed in my above-identified patent are entirely satisfactory but are less than perfect. For example, the magnetization system as disclosed is not as good as it might be with certain types of articles, especially pipe. The provision of the alternating biasing field is highly advantageous but as a practical matter, is somewhat expensive.

The present invention was evolved with the object of improving the systems as disclosed in my above-identified patent, in these and other respects.

According to an important feature of this invention, the magnetic field is developed by the use of unfiltered rectified alternating current, preferably half-wave, instead of from direct current with a superposed alternating current. With this feature, it is found that the results are superior to those obtained from the use of superposed direct and alternating currents, and the unfiltered rectified alternating current is much easier and simpler to apply.

A further important feature of this invention is in the application of magnetic flux to a pipe by disposing in the pipe a coil with the axis of the coil extending along the axis of the pipe. An important feature is that the coil is of short length relative to the pipe and is moved along the pipe, rather than extending for the full length of the pipe. Further important features reside in the construction of the coil and in the use of a tube of conductive material to receive and guide the coil and also to provide improved performance characteristics.

Still another important feature of the invention is in the construction of the tube or other device used as the recording medium, to provide better indications of flaws.

This invention contemplates other and more specific objects, features and advantages which will become more fully apparent from the following detailed description taken in conjunction with the accompanying drawings which illustrate preferred embodiments and in which:

Figure 1 is a cross-sectional view illustrating a preferred arrangement for the testing of pipe, and an improved energizing arrangement being also illustrated schematically; and Figure 2 is a cross-sectional view illustrating how the tube used as a recording medium is disposed within a pipe.

Reference numeral 10 generally designates a system constructed according to the principles of this invention, which is used for the detection of flaws in a pipe 11.

In this system, a tube 12 is inserted within the pipe and is then expanded into engagement with the interior surface of the pipe. The tube 12 contains uniformly distributed magnetizable material. A magnetizing coil generally indicated by reference numeral 13 is disposed within the tube 12 and the pipe 11 and is moved along the axis of a pipe while an energizing current is being supplied thereto from a circuit 14. The coil 13 and the tube 12 are then removed from the pipe. Free magnetizable particles such as powdered iron is then dusted over the tube. If the pipe is of uniform composition with no defects therein, the tube 12 will be uniformly magnetized and the particles will not be attracted to any localized area. However, if there is a flaw in the pipe, a distorted field will be recorded by the tube 11, and the particles will be attracted to a localized portion of the tube 12 which corresponds to the position of the flaw in the pipe.

After the flaws are so located, the tube 12 may be subjected to a demagnetizing field, and may then be used for a further testing operation.

An important feature of the invention is in the construction of the coil 13. It will be appreciated that with an electric current passing through the coil, opposite magnetic poles will be developed at the opposite ends of the coil. As the coil is then moved axially through the pipe, the magnetic pole at the forward end of the coil, with respect to the direction of travel, will impose on adjacent portions on the tube 12 and pipe 11 a magnetizing field which will be oriented in one direction. As the coil is then moved along, the rearward pole will produce an oppositely oriented magnetic field. If the fields thus produced by the opposite poles are of substantially equal magnitude, the tube 12 will be magnetized to little or no extent, and the detection of defects will be very difficult.

According to this invention, one of the poles has an effective area substantially greater than that of the other of the poles, so that the flux density on the adjacent portions on the tube 12 and the pipe 11 is substantially reduced. With this arrangement, it is found that a high degree of magnetization is produced in the tube 12 at points corresponding to flaws in the pipe 11.

In the illustrated embodiment, the effective area of one of the poles is increased by utilizing a tapered construction, and preferably by utilizing a core 15 of magnetic material having a tapered end portion 16. Instead of using the tapered construction, and preferably in addition thereto, the core is so wound that the number of turns per unit axial length is decreased at one end of the coil. Thus turns 17 at the tapered end of the coil are spaced much further apart than turns 18 adjacent the other end thereof.

It should be here noted that the coil may have a fewer number of turns than the number illustrated in the drawing and of course, the wire size may be much larger than would be indicated from the diagrammatic illustration of the drawing.

As diagrammatically illustrated, the ends of the coil 13 are connected to conductors 19 and 20 which extend through a support rod 21 which is used to effect movement of the coil through the pipe. The conductors 19 and 20 are connected to the secondary 22 of a transformer 23 with a halfwave rectifier 24 connected in series. The transformer 23 has a primary 25 connected through an on-off switch 26 to terminals of an alternating current source indicated by reference numeral 27. The alternating current source 27 may be any suitable source such as a conventional power line operated at 25, 50 or 60 cycles.

The use of unfiltered rectified alternating current is an important feature of the invention. In particular, in addition to the direct current component which is required for proper magnetization, it provides an infinite number of alternating current components, and it is found that the indication that is produced is much superior to that produced by a pure direct current or a filtered rectified current. It is superior to the use of a direct current source in combination with an alternating current source, in that it is much simpler and requires fewer components, thus being most reliable in operation. A full wave rectifier may be used, but a half-wave rectifier is preferably used because of its simplicity. It is, of course, desirable that no filtering be employed.

A further feature of the invention is in the provision of a tube or sleeve when the tube 12 which receives and guides the coil 13. A guide ring 29 may be fixed to the coil to engage the inside surface of the sleeve 28, or in many cases, the outer surface of the coil 13 may engage the inside surface of the sleeve 28 to guide the coil. The sleeve 28 may have an end wall 30 apertured to receive the rod 21. The plurality of fingers, such as fingers 31 and 32 as illustrated may be employed to position the sleeve 28 coaxially within the tube 12 and the pipe 11.

According to this invention, the sleeve 28 is of conductive material, and it is found that much improved results are achieved thereby. It is not known exactly why such improved results are obtained but it is believed that without the sleeve, the pipe acts as a shorted turn inductively coupled to the coil and that from the current thus flowing in the pipe, a flux is induced in the recording tube 12 that opposes the effect of the uni-directional flux of the magnetizing coil 13. By providing the sleeve of the conductive material, it acts as a shorted turn and it is believed that the flux resulting from current flow in the sleeve 28 opposes that produced by current flow in the pipe 11, to thus minimize the effect on the uni-diretcional flux produced in the magnetizing coil.

Instead of making the sleeve 28 of conductive material, it is also possible to make it of a non-conductive material and to provide a relatively short sleeve of conductive material around the magnet.

The tube 12 is preferably made of a vinyl material which is advantageous because it can be made from a plurality of sections which are readily secured integrally together by use of a suitable solvent, as will be appreciated by those skilled in the art. A paint is applied to the outer surface of the tube. The paint may include an iron oxide material in a suitable vehicle, such as an iron oxide material as used in the manufacture of tapes for conventional magnetic recorders. Preferably, however, the paint comprises finely divided stainless steel in a suitable vehicle. The composition of the stainless steel is such that it would normally be non-magnetic, but in reducing the stainless steel to powder or leaf form through a conventional milling process, the cold working of the material is sufficient to render it magnetic. The use of stainless steel paint is of particular advantage in that it is readily orientede.

As a specified example, the stainless steel pigment may be either an alloy of 17% chromium and 10% nickel and iron or 18% chromium and 8% nickel with the rest iron. The resin portion of the paint consists of dissolved polyvinyl chloride which is dissolved in a ketone and tetrahydrofuran. In general, any elastomer which will adhere to the vinyl base is satisfactory.

When the paint is applied, a magnetizing field is also applied to provide grain orientation. The orientation should preferably be such that it extends axially of the pipe, and it provides a superior indication of flaws which normally extend generally at right angles to the pipe axis.

A further feature of the invention relates to the disposition of the tube 12 within the pipe 11. According to this feature, a stiffening member 33 of arcuate cross-sectional configuration, preferably of non-magnetic spring stock such as phosphor bronze, is disposed within the tube 12 to facilitate insertion thereof into the pipe. A partial inner liner 34 may be disposed within the tube over the stiffening member 33 to maintain the member in proper relation to the tube. After the tube 12 is inserted within the pipe 11, air or other fluid under pressure may be admitted into the tube, as by means of a filling device 35, as illustrated in Figure 1. The edge of the tube at the open end thereof may be engaged with a flange 36 on the guide sleeve 28.

The inner liner 34 may be provided with holes 37 and the stiffening member 33 may be provided with holes 38 to permit the air or other fluid under pressure to press the tube 12 into firm engagement with the interior surface of the pipe.

It will be understood that modifications and variations may be effected without departing from the spirit and scope of the novel concepts of this invention.

I claim as my invention:

1. In a method of testing pipe for defects, the steps of disposing within said pipe a tube having uniformly distributed magnetizable material therein, disposing a coil coaxially within said pipe and said tube, and moving said coil longitudinally within said pipe and tube.

2. In a method of testing pipe for defects, the steps of disposing within said pipe a tube having uniformly distributed magnetizable material therein, disposing a sleeve of conductive material within said tube, disposing a coil coaxially within said sleeve, and applying an energizing current to said coil.

3. In a method of testing pipe for defects, the steps of disposing within said pipe a tube having uniformly distributed magnetizable material therein, disposing a sleeve of conductive material within said tube, disposing a coil coaxially within said sleeve, and moving said coil axially within said sleeve with said sleeve acting as a guide for movement of said coil.

4. In an apparatus for testing articles for defects, a member of sheet material arranged to be disposed against one surface of the article, and a coating on one surface of said member comprising a vehicle loaded with finely divided stainless steel.

5. In apparatus for testing an article for defects, a member arranged to be disposed against a surface portion of the article, and means for applying a magnetic flux to said article with said member disposed thereagainst, said member having magnetizable particles uniformly distributed therein, with said particles being predominantly oriented in a direction parallel to said magnetic flux.

6. In apparatus for testing a pipe for defects, a tube of flexible material arranged to be disposed in the pipe, a stiffening member of arcuate cross-section in said tube to facilitate insertion thereof to said pipe, and a partial inner liner member of flexible material in said tube disposed over said stiffening member to hold said stiffening member in place in said tube.

7. In apparatus for testing an article for defects, a member arranged to be disposed against a surface portion of the article and having uniformly distributed magnetizable material therein, and field-producing means for inducing in the article a field having a large uni-directional component for inducing in said member a field which is uniform except as distorted by defects in the article and a multiplicity of high frequency components of smaller magnitude for increasing magnetization of the material in said member in response to defects in the article, said field-producing means comprising alternating current source means, and rectifier means connected to said source means for developing a pulsating current having a large uni-directional component and a multiplicity of alternating current components.

8. In apparatus for testing pipe, a tube having uniformly distributed magnetizable material therein disposable within the pipe, a magnetizing solenoid coil, means for supporting said coil coaxially within said tube to be moved axially therethrough, and means for energizing said coil to develop magnetic poles at the opposite ends thereof, one of said poles having an effective area substantially greater than that of the other of said poles, whereby said other of said poles has an effective strength greater than one of said poles.

9. In apparatus for testing pipe, a tube having uniformly distributed magnetizable material therein disposable within the pipe, a magnetizing solenoid coil, means for supporting said coil coaxially within said tube to be moved axially therethrough, and means for energizing said coil to develop magnetic poles at the opposite ends thereof, said coil being so wound that the number of turns per unit axial length is decreased adjacent one end thereof, whereby the pole of said one end thereof has an effective area substantially greater than that of the other of said poles.

10. In an apparatus for testing pipe, a tube having uniformly distributed magnetizable material therein disposable within the pipe, a magnetizing solenoid coil, means for supporting said coil coaxially within said tube to be moved axially therethrough, means for energizing said coil to develop magnetic poles at the opposite ends thereof, and a core within said coil having a tapered end portion, whereby the pole adjacent said one end thereof has an effective area substantially greater than that of the other pole.

References Cited in the file of this patent

UNITED STATES PATENTS

| | | |
|---|---|---|
| 890,085 | McCann et al. | June 9, 1908 |
| 916,541 | Eastham | Mar. 30, 1909 |
| 1,828,190 | Kiliani | Oct. 20, 1931 |
| 2,065,118 | Davis | Dec. 22, 1936 |
| 2,217,733 | De Forest | Oct. 15, 1940 |
| 2,236,373 | Kowalski | Mar. 25, 1941 |
| 2,363,101 | Van der Heem | Nov. 21, 1944 |
| 2,425,857 | Barnes et al. | Aug. 19, 1947 |
| 2,427,872 | Newman | Sept. 23, 1947 |
| 2,622,125 | Bender | Dec. 16, 1952 |
| 2,622,126 | Bender et al. | Dec. 16, 1952 |
| 2,745,043 | Ambrose | May 8, 1956 |
| 2,764,733 | De Forest | Sept. 25, 1956 |

FOREIGN PATENTS

| | | |
|---|---|---|
| 547,714 | Great Britain | Sept. 8, 1942 |
| 774,192 | Great Britain | May 8, 1957 |